Patented May 13, 1930

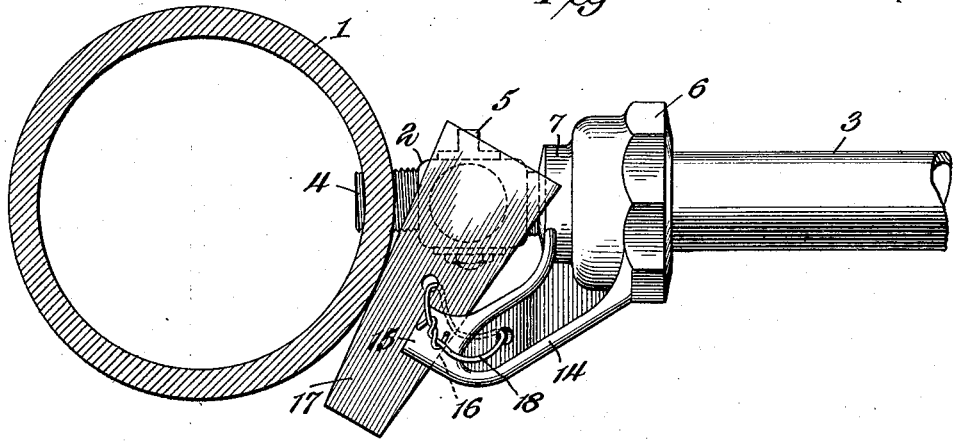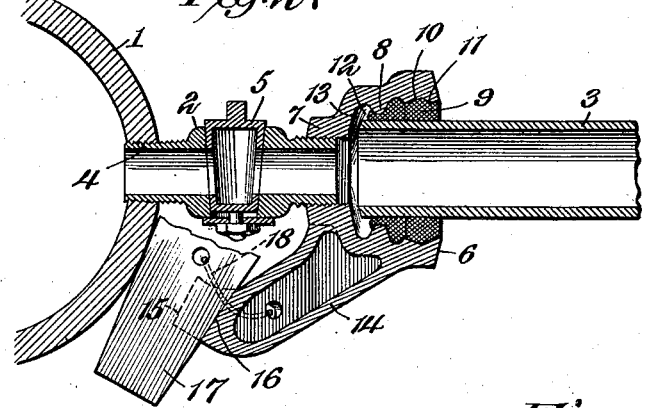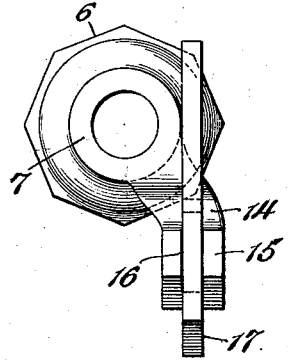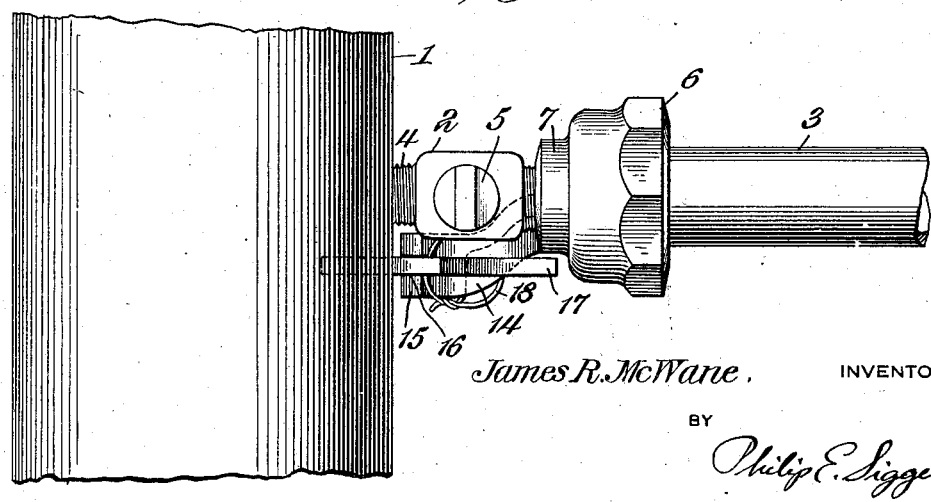

1,758,455

UNITED STATES PATENT OFFICE

JAMES R. McWANE, OF BIRMINGHAM, ALABAMA, ASSIGNOR TO McWANE CAST IRON PIPE COMPANY, OF BIRMINGHAM, ALABAMA, A CORPORATION OF ALABAMA

PIPE JOINT

Application filed March 23, 1927. Serial No. 177,567.

This invention relates to pipe joints, and among other objects aims to provide a connection between a corporation cock and a service line which permits deflection of the service line without leakage, and which minimizes the likelihood of leakage between the corporation cock and the main.

In the drawings, in which the preferred embodiment of the invention is shown:

Figure 1 is an elevation with the main shown in section;

Figure 2 is a vertical section through the parts shown in Figure 1;

Figure 3 is an end elevation of the bell connection; and

Figure 4 is a top plan view.

Referring more specifically to the drawings, there is shown a main 1, a corporation cock 2, and its service line 3, the corporation cock being secured, for example, by screw-threads 4 to the main 1 and having the usual valve 5 to permit connecting or disconnecting of the service line from the main.

It frequently happens that due to subsistence of the supporting strata or to heavy traffic on the ground above, the service line leading from a main is very seriously deflected. This throws a strain both on the connection between the service line and corporation cock and on the connection between the corporation cock and the main and sometimes causes the threads of the latter connection to strip with resultant leakage or causes the corporation cock to break off under the stresses set up, necessitating repair.

To minimize the possibility of leakage arising from deflection of the service line, I have provided a flexible connection between the service line and the corporation cock and I have also provided a support for the outer end of the corporation cock, so as to prevent undue strains being placed on its connection with the main.

Referring to Figures 1 and 2 there is shown a bell connection 6 between the corporation cock and the service line, said bell connection, in this instance, having a screw-threaded boss 7, so as to permit attachment to the outer end of the corporation cock. The other end of the bell connection is enlarged so as to receive the end of the service line 3, preferably with flexible packing interposed between the bell and the service line, so as to make a perfectly tight joint, while permitting a certain amount of deflection of the service line.

On the interior of the bell there is an annular shoulder 8 providing an abutment for the packing 9; and between the annular shoulder and the outer enlarged end of the bell there are a series of surfaces 10, 11 so shaped as to interlock with the packing when the packing is forced in position, thereby preventing movement of the packing after the installation has been completed. The packing or joint material may be of jute on the inside and of lead on the outside and the packing may be partially calked prior to the installation.

It will be clear that if the service line is subjected to such stresses as would cause it to be deflected, the end which is joined to the bell may move within the bell, a chamber 12 being provided to receive the end of the service line and permit relative movement thereof. Preferably, the end of the service line is rounded or beveled, as shown in Figure 2, facilitating movement of said end within the chamber 12, particularly when the end of the line is in contact with the wall 13 of the bell member.

To support the outer end of the corporation cock, a bridge member is provided which spans the space between the main and the bell member. In this instance, the bridge member is formed by an extension 14 of the bell connection, said extension having an upturned portion 15 provided with a groove 16 to receive the wedge 17, interposed between the extension and the main, and driven into position so as to transmit some of the load on the outer end of the corporation cock to the main. Preferably the wedge 17 is connected by a tie 18 to the extension 14, so that the wedge will not be lost during handling and shipment of the connection.

To permit hammering of the wedge into position, the extension 14 is offset as shown in Figures 3 and 4. It will be clear that when the wedge is driven home, the tendency will be to push the bell connection outwardly and upwardly, thus relieving some of the stresses on the connection between the corporation cock and the main.

This case is a substitution for that part of the pending application, Serial No. 46,812, filed July 29, 1925, which is illustrated in Figures 1, 2, 3 and 4 of the drawings of that application. In a co-pending application, Serial No. 177,566, filed on the same day, and also a substitute in part for said application, I have described and claimed specifically the construction of Figures 5, 6 and 7.

Obviously the present invention is not restricted to the particular embodiment thereof herein shown and described. Moreover, it is not indispensable that all the features of the invention be used conjointly, since they may be employed advantageously in various combinations and sub-combinations.

What is claimed is:—

1. A bell for connecting a pipe to a main through a corporation cock, said bell having means for connection to the cock, means on the bell to form a joint with the end of the said pipe, and means carried by the bell to contact with the side of the main to reinforce the connection of the cock therewith.

2. A bell for connecting a service pipe to a main having a corporation cock tapped therein and threaded on its outer end, said bell having a smaller end provided with an internally threaded bore adapted to be attached to the outer end of the cock, and bracing means carried by the bell to contact with the main below the cock to strengthen the connection between the main and the service pipe.

3. A bell for connecting a service pipe to a main having a corporation cock, said bell adapted to be attached to the corporation cock, calking material carried in the mouth of the bell for forming a joint with the end of the service pipe, and bracing means carried by the bell to contact with the main below the cock to strengthen the connection between the main and the service pipe.

4. A combination bell and brace for connecting a service pipe to a main having a corporation cock communicating therewith, said cock having a threaded outer end and having a smaller capacity than the service pipe, said bell having threads for connection to the cock, joint material carried in the mouth of the bell for calking around the end of the service pipe, an internal annular rib in the bell to form an abutment for the joint material, and depending bracing means carried by the bell and including a movable member for adjustment into contact with the main to help support the service pipe.

5. A combination bell and brace for connecting a service pipe to a main having a corporation cock communicating therewith, said cock having a threaded outer end and having a smaller capacity than the service pipe, said bell having threads for connection to the cock, joint material carried in the mouth of the bell for calking around the end of the service pipe, an internal annular rib in the bell to form an abutment for the joint material, said rib being spaced away from the pipe to allow the material to squeeze therethrough when calked and form a fulcrum for the pipe when deflected.

6. A combination bell and brace for connecting a service pipe to a main having a corporation cock communicating therewith, joint material carried in the mouth of the bell for calking around the end of the service pipe, an internal annular rib in the bell to form an abutment for the joint material, said rib being spaced away from the pipe to allow the material to squeeze therethrough when calked and form a fulcrum for the pipe when deflected, a depending arm carried by the bell, and a movable member coacting with the arm to contact with the main and brace the connection.

7. A connection between a service pipe and a main having a corporation cock comprising, in combination, a bell having a reduced end threaded on the cock, the outer end of the bell being open and provided with joint material calked tightly around the pipe, a depending arm integrally joined to the bell and extending forwardly below the cock and having a lateral bend or offset, the end of the arm being provided with a slot; and a wedge adapted to slide in the slot and to be driven downwardly into tight binding relation with the side of the main to brace the connection.

8. A connection between a service pipe and a main having a corporation cock, comprising in combination, a bell having a reduced end threaded on the cock, the outer end of the bell being open and provided with joint material calked tightly around the pipe, a depending arm integrally joined to the bell and extending forwardly below the cock and having a lateral bend or offset, the end of the arm being provided with a slot; and a wedge adapted to slide in the slot and to be driven downwardly into tight binding relation with the side of the main to brace the connection, said depending arm and the wedge each having a hole formed therein to permit tying the parts together to prevent loss.

9. In combination with a main, a corporation cock screwed into the same, a bell screwed onto the outer end of the cock, a depending arm integrally joined to the bell and extending forwardly below and to one side of the cock, and means contacting with the main and said arm to transfer some of the load on the outer end of the corporation cock directly to the main.

10. In combination with a main, a corporation cock screwed into the same, a member screwed onto the outer end of the cock, a depending arm integrally joined to the member, and means contacting with the main and said arm to transfer some of the load on the outer end of the corporation cock directly to the main.

11. Means for connecting a service pipe to a main through a corporation cock, comprising a combination bell and bridge member; said bell having a reduced end for connection with the cock; said bridge member comprising an integral arm depending from the bell and a separate member in contact with the main to brace the connection.

12. As an article of manufacture, a bell formed at one end for connection with a corporation cock, and having an enlarged mouth at the other end to receive a service line and packing; and a bridge member adapted to be wedged between the main and the bell and thereby transmit some of the load on the outer end of the corporation cock directly to the main.

13. As an article of manufacture, a bell formed at one end for connection with a corporation cock; and a bridge consisting of an extension on the bell, and a separate member adapted to be interposed between the extension and a main, said bridge transmitting some of the load on the outer end of the corporation cock directly to the main.

In testimony that I claim the foregoing as my own, I have hereto affixed my signature.

JAMES R. McWANE.